(12) United States Patent
Kim

(10) Patent No.: US 7,075,879 B2
(45) Date of Patent: Jul. 11, 2006

(54) OPTICAL PICKUP DEVICE AND A METHOD TO CONTROL AN ANGLE BETWEEN A PIT AND A MAJOR AXIS OF A LASER BEAM

(75) Inventor: Bong-gi Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 557 days.

(21) Appl. No.: 10/461,328

(22) Filed: Jun. 16, 2003

(65) Prior Publication Data

US 2003/0231572 A1    Dec. 18, 2003

(30) Foreign Application Priority Data

Jun. 14, 2002    (KR) .............................. 2002-33402

(51) Int. Cl.
*G11B 7/00*    (2006.01)

(52) U.S. Cl. ........................ 369/112.03; 369/112.04; 369/112.01; 369/44.37

(58) Field of Classification Search ................... None
See application file for complete search history.

(56) References Cited

U.S. PATENT DOCUMENTS

| 6,130,872 A | * | 10/2000 | Sugiura et al. ........ 369/112.04 |
| 2001/0050933 A1 | * | 12/2001 | Takahashi et al. ............ 372/43 |
| 2002/0027844 A1 | * | 3/2002 | Furuhata et al. ......... 369/44.37 |
| 2002/0064121 A1 | * | 5/2002 | Takahashi .............. 369/112.22 |

* cited by examiner

*Primary Examiner*—Muhammad Edun
(74) *Attorney, Agent, or Firm*—Staas & Halsey LLP

(57) ABSTRACT

An optical pickup device for a relatively thick disc and/or a relatively thin disk including first and second laser light sources emitting first and second light beams, a first grating splitting the light beams emitted from the second light source, a beam splitter changing optical paths of the light beams emitted from the first and second laser light sources, and an objective lens focusing the light beams passing through the beam splitter onto one of the discs. A photodetector receives and detects the light beams that proceed back after being reflected by one of the discs. A second grating corrects a position of a light spot formed on the photodetector after being reflected by the relatively thin disc or the relatively thick disc, wherein the second grating includes a pattern that is rotated by a predetermined angle with respect to a pattern of the first grating.

23 Claims, 9 Drawing Sheets

OPTICAL PICKUP DEVICE AND A METHOD TO CONTROL AN ANGLE BETWEEN A PIT AND A MAJOR AXIS OF A LASER BEAM

CROSS-REFERENCE TO RELATED APPLICATIONS

This application claims the priority of Korean Patent Application No. 2002-33402 filed Jun. 14, 2002 in the Korean Intellectual Property Office, the disclosure of which is incorporated herein in its entirety by reference.

BACKGROUND OF THE INVENTION

1. Field of the Invention

The present invention relates to an optical pickup device and a method to control an angle made between a pit and a major axis of a laser beam, by which a superior reproduction signal feature can be obtained and by which a force corresponding to a birefringent disc is improved by controlling the pit and the major axis of the laser beam to form a predetermined angle.

2. Description of the Related Art

FIG. 1 shows an optical pickup device having an optical module 1 in which first and second laser light sources 3 and 5 emit first and second light beams I and II having different wavelengths and are integrally formed, as a technology relevant to the present invention. The optical pickup device includes the optical module 1, a beam splitter 10 reflecting or transmitting a light beam emitted from the optical module 1 to change an optical path, an objective lens 15 focusing the light beam reflected by the beam splitter 10 onto a relatively thin disc 17 or a relatively thick disc 18, and a photodetector 23 receiving and detecting the light beam that proceeds back after being reflected by the discs 17 and 18.

The optical module 1 has a mount 2 on which the first and second laser light sources 3 and 5 having different wavelengths are mounted. The first laser light source 3 is a laser diode emitting the light beam having a 650 nm wavelength, for example, and is used for the relatively thin disc 17, for example, a DVD. The second laser light source 5 is a laser diode emitting the light beam having a 780 nm wavelength, for example, and is used for the relatively thick disc 18, for example, a CD. These first and second laser light sources 3 and 5 are arranged to be separated about 110±2 μm from each other.

A grating 7 that divides the light beam emitted from the second laser light source 3 into three beams is provided on an optical path between the optical module 1 and the beam splitter 10, to detect a tracking error using a three-beam method to be described later.

The light beams reflected by the discs 17 and 18 are focused on the photodetector 23 after sequentially passing through the objective lens 15, a collimating lens 13, and the beam splitter 10. Here, a concave lens 20 may further be provided between the beam splitter 10 and the photodetector 23. The concave lens 20 is inclined in a direction opposite to an angle at which the beam splitter 10 is inclined to increase a size of a light spot formed on the photodetector 23, together with the collimating lens 13 and to remove coma aberration generated in the light beam passing through the beam splitter 10.

In the meantime, the light beams reflected by the discs 17 and 18 are formed on the photodetector 23. The photodetector 23, as shown in FIG. 2A, may be provided to correspond to each of the first and second laser light sources 3 and 5. For example, the photodetector 23 may be formed of a first photodetector 25 to detect the light beam emitted from the first laser light source 3 and a second photodetector 26 to detect the light beam emitted from the second laser light source 5. The first photodetector 25 is a four-section photodetector. The second photodetector 26 is formed of a four-section main optical sensor 26a and first and second sub-optical sensors 26b and 26c.

As tracking error detection and focusing error detection are made by using signals detected by the first and second photodetectors 25 and 26, tracking and focus servo are performed.

A focusing servo of the first and second laser light sources 3 and 5 to the discs 17 and 18 is performed in an astigmatism method using a defocusing effect of an optical disc. A tracking servo of the first disc 17 is performed in a differential phase detection (DPD) method. The tracking servo of the second disc 18 is performed in a three-beam method. Here, the three-beam method is carried out by using the light beam which is diffracted by a grating 7 into three beams, reflected by the disc 18, and received and detected by the main and sub-optical sensors 26a, 26b, and 26c of the second photodetector 26.

A principle of reproducing information recorded on the disc 17 or 18 as the light beam passes along tracks formed on the disc by using the first and second photodetectors 25 and 26 is described below.

Referring to FIG. 2B, information is recorded in the form of a pit 33 that is formed along a track 30 of the respective discs 17 and 18. Reference numeral 35 denotes a first light spot which is formed by the light beam emitted from the first laser light source 3 focused on the respective discs 17 or 18. Reference numerals 36a, 36b, and 36c respectively denote a second main light spot and first and second side light spots which are formed by the light beam emitted from the second laser light source 5 split into three beams by the grating 7 and the three beams are focused on the respective discs 17 or 18.

However, because the first and second laser light sources 3 and 5 are arranged in the optical module 1, parallel to each other, the photodetectors 25 and 26 corresponding to the first and second laser light sources 3 and 5 are arranged parallel to each other. Because the first and second side light spots 36b and 36c are used for tracking, the first and second side light spots 36b and 36c are arranged parallel to a track direction T, which is a pit direction (Pit). Thus, as shown in FIG. 2A, a direction along which the first and second side light spots 36b and 36c are formed on the photodetectors 25 and 26 indicates the track direction T, and a direction perpendicular to the track direction T is a disc radial direction R.

As shown in FIG. 3A, the laser beams emitted from the first and second laser light sources 3 and 5 pass through a laser emission outlet 6 that is narrow. The laser beam is diffracted while passing through the laser emission outlet 6. As a size of the laser emission outlet 6 decreases, a diffraction angle increases. As shown in FIG. 3B, because the size of the laser emission outlet 6 in a horizontal direction M and a vertical direction L, through which the laser beam is emitted, are different, the laser beam is diffracted at different angles in the horizontal direction M and the vertical direction L. Here, the laser beam in the vertical direction L appears to be emitted from a point located at the front portion of the laser light source while the laser beam in the horizontal direction M appears to be emitted from a point located a distance ΔZ behind a front portion of the laser light source. The above path difference between the light beams in the horizontal direction and the vertical direction results in astigmatism. Here, θII denotes an angle spreading in the horizontal direction M and θ⊥ denotes an angle spreading in the vertical direction L.

Here, the vertical direction L is typically referred to as the major axis direction of the laser beam. The light beam emitted from the laser light sources 3 and 5, as shown in FIG. 4, has a major axis direction arranged parallel to a pit 33 on the disc 17 or 18. In FIG. 4, profiles of the first and second light beams I and II emitted from the laser light sources 3 and 5 are illustrated to be slightly exaggerated. However, it is widely known that, when the major axis of the laser beam does not make an angle of 45° with the pit, a defocus phenomenon occurs so that a signal characteristic deteriorates and a signal reproduction is difficult when the disc 17 or 18 has a large birefringence.

Thus, a variety of methods to form the light spot on the pit 33 such that the major axis direction of the light spot is angled by 45° with respect to the pit have been suggested. First, as one of simple methods, as shown in FIG. 5A, by rotating the optical module 3 and 5 by 45° such that the vertical direction L of the laser emission outlet 6 is rotated by 45°, the major axis of the light spot formed on the disc and the pit makes an angle of 45°. Here, when the laser light source 5 for the CD is rotated by 45° around the laser light source 3 for the DVD, the position of the light spot formed on the disc 17 or 18 is not affected. However, because the laser light source of the CD is rotated by 45° on the photodetector 23, the light reflected by the disc 17 or 18 is rotated by 45° and formed on the photodetector 23. Thus, as shown in FIG. 5B, by rotating the laser light source by 45°, the photodetector 23 is rotated by 45° to correspond to a changed position of the laser light source.

Here, the first and second sub-optical sensors 26b and 26c of the photodetector 23 should always be arranged parallel to the track direction T, that is, the direction of the pit 33, to enable tracking servo. When the photodetector 23 is rotated as above, because a side beam is not formed any more parallel to the track direction T on the photodetector 23, tracking cannot be performed. Thus, the above method cannot be a conclusive solution to have the major axis of the laser beam inclined by 45° with respect to the pit 33.

SUMMARY OF THE INVENTION

To solve the above and/or other problems, according to an aspect of the present invention, there is provided an optical pickup device and a method to control an angle made between a pit and a major axis of a laser beam by arranging a grating to correct a position of the laser beam between a beam splitter and a photodetector.

According to an aspect of the invention, an optical pickup device for a relatively thick disc and/or a relatively thin disk, includes: a mount; first and second light services emitting light beams having different wavelengths; an optical module in which the first and second laser light sources are horizontally mounted on the mount and one of the first and second light sources is rotated by a predetermined angle with respect to the other light source; a first grating splitting the light beams emitted from the second light source; a beam splitter changing optical paths of the light beams emitted from the first and second laser light sources; an objective lens focusing the light beams passing through the beam splitter onto the relatively thick disc or the relatively thin disc; a photodetector receiving an incident light beam, which is reflected by the relatively thick disc or the relatively thin disc and passes through the objective lens and the beam splitter; and a second grating arranged on an optical axis between the beam splitter and the photodetector and correcting a position of a light spot formed on the photodetector.

According to another aspect of the invention, a method of adjusting an angle between a major axis of a light spot of a laser beam emitted from an optical module comprising first and second light sources, a first grating, a second grating, a beam splitter, an objective lens, and a photodetector, wherein, in the optical module, the first and second laser light sources emitting light beams having different wavelengths are integrally formed, and incident on a disc, where a pit formed on the disc, the method including: arranging the first and second laser light sources by rotating one laser light source by a predetermined angle with respect to the other laser light source; splitting the light beam emitted from the second laser light source into three beams by a first grating, wherein the light beam emitted from the first or second laser light source pass through the first grating, the beam splitter, and the objective lens and is reflected by the disc; and correcting a position of the light spot focused on the photodetector by using the second grating comprising a pattern deviated by the predetermined angle with respect to a pattern of the first grating, when the light beam split by the first grating into three beams is reflected by the disc and proceeds back.

According to an aspect of the present invention, there is provided an optical pickup device for a relatively thick disc and/or a relatively thin disk including first and second laser light sources emitting first and second light beams, a first grating splitting the light beams emitted from the second light source, a beam splitter changing optical paths of the light beams emitted from the first and second laser light sources, and an objective lens focusing the light beams passing through the beam splitter onto one of the discs. A photodetector receives and detects the light beams that proceed back after being reflected by one of the discs. A second grating corrects a position of a light spot formed on the photodetector after being reflected by the relatively thin disc or the relatively thick disc, wherein the second grating includes a pattern that is rotated by a predetermined angle with respect to a pattern of the first grating.

According to an aspect of the present invention, there is provided a method of an optical pickup device for a relatively thick disc and/or a relatively thin disk, wherein the optical pickup comprises a photodetector, a first grating, and a second grating, the method including: emitting first and second light beams having different wavelengths; splitting the light beams into three light beams using a first grating; changing optical paths of the light beams emitted; focusing the split light beams onto the relatively thick disc or the relatively thin disc; receiving and detecting the light beams that proceed back after being reflected by the relatively thick disc or the relatively thin disc; and correcting a position of a light spot formed on the photodetector using the second grating after being reflected by the relatively thin disc or the relatively thick disc, wherein the second grating includes a pattern that is rotated by a predetermined angle with respect to a pattern of the first grating.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and/or advantages of the invention will become apparent and more readily appreciated from the following description of the aspects of the present invention, taken in conjunction with the accompanying drawings of which.

DETAILED DESCRIPTION OF THE INVENTION

Figure 1:
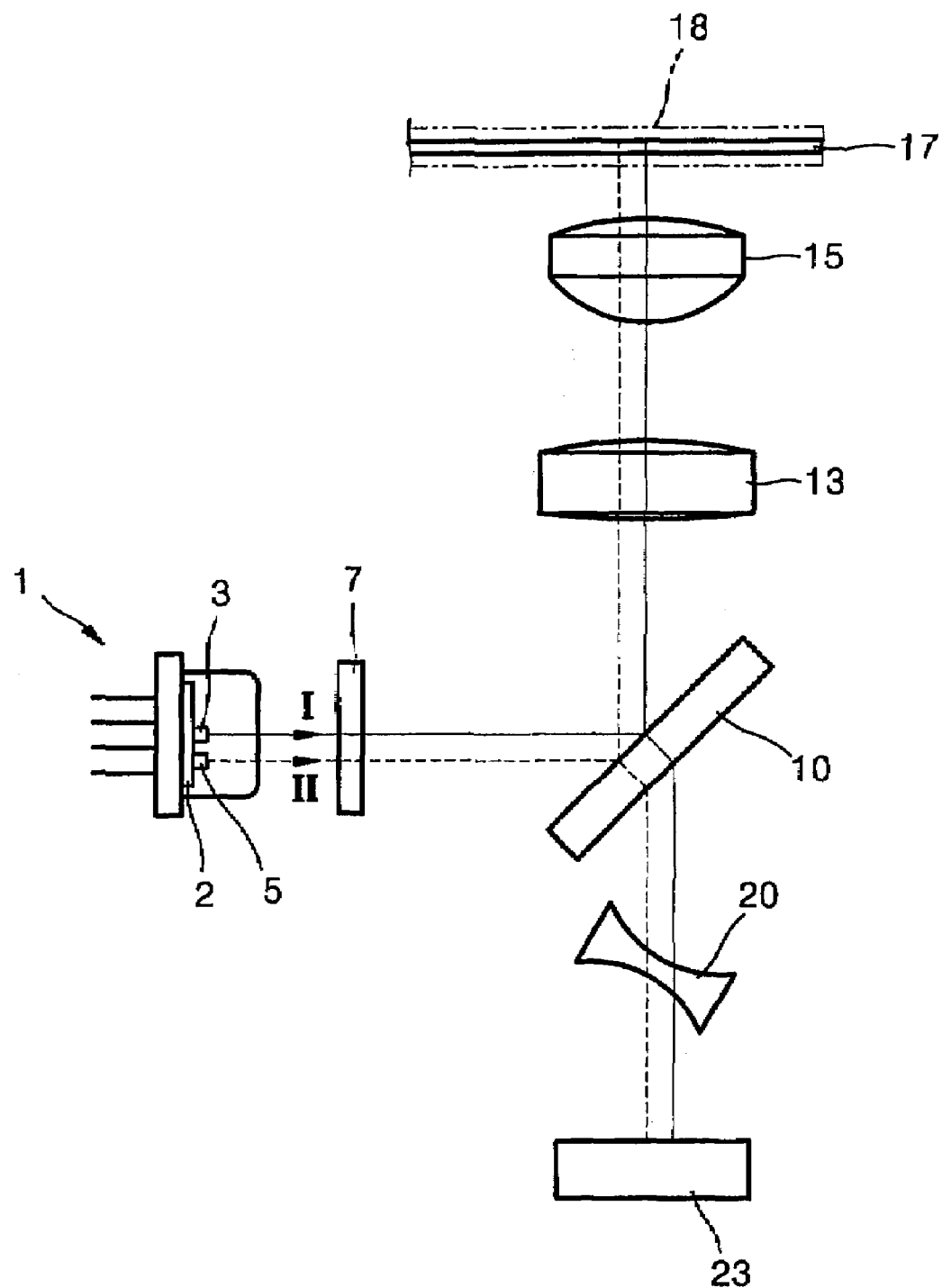
FIG. 1 is a view illustrating a conventional optical pickup device.
Figure 2A:
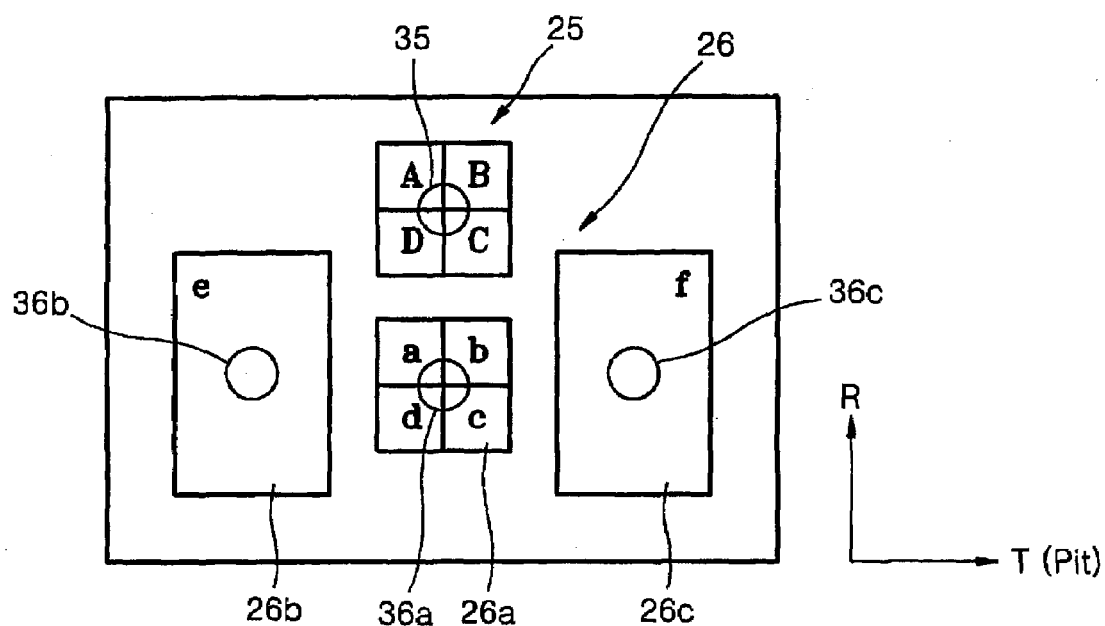
FIG. 2A is a view illustrating a structure of a conventional photodetector.
Figure 2B:
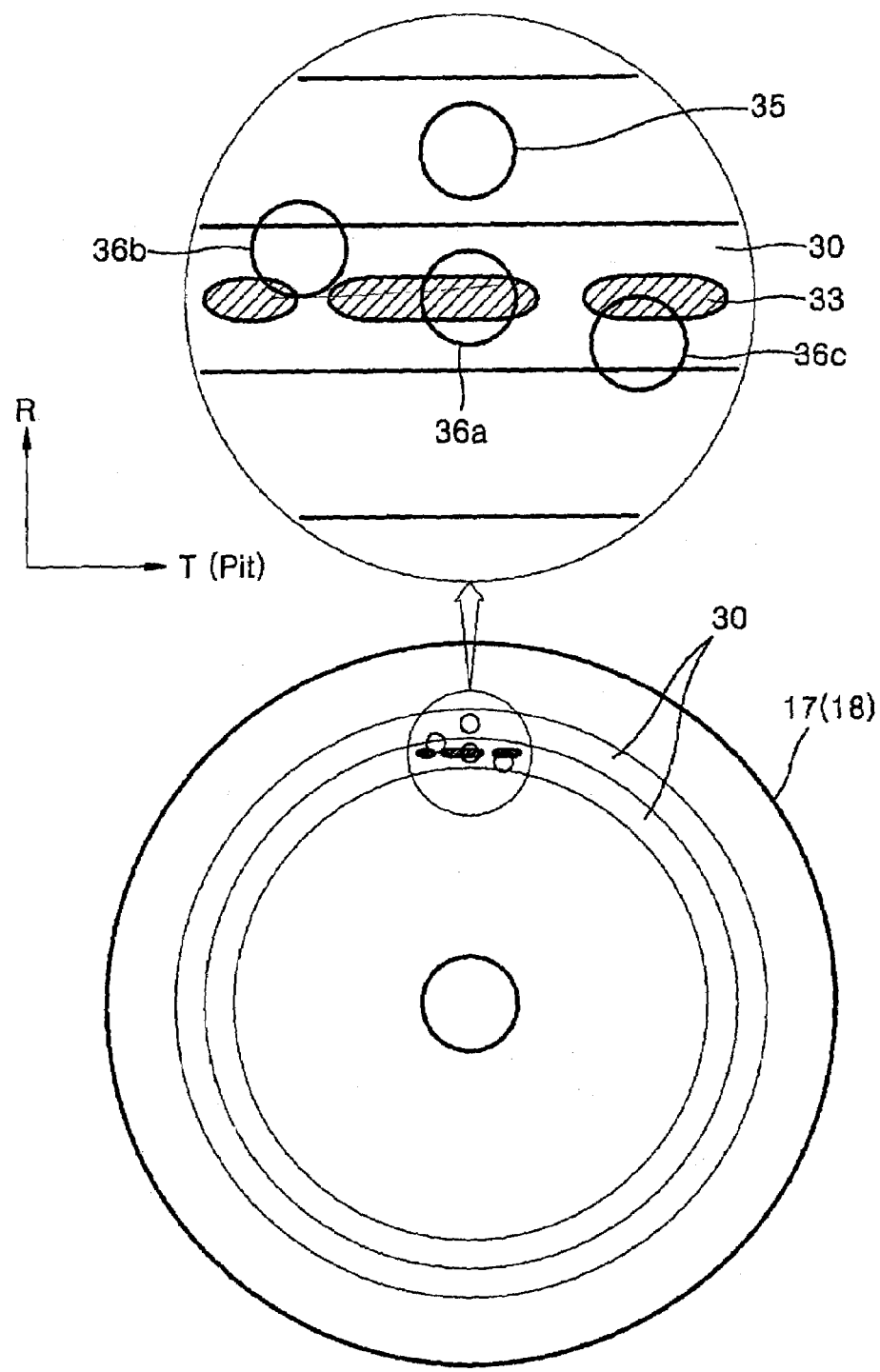
FIG. 2B is a view illustrating a pit formed in a track of a disc and a laser beam irradiated onto the disc.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 6:
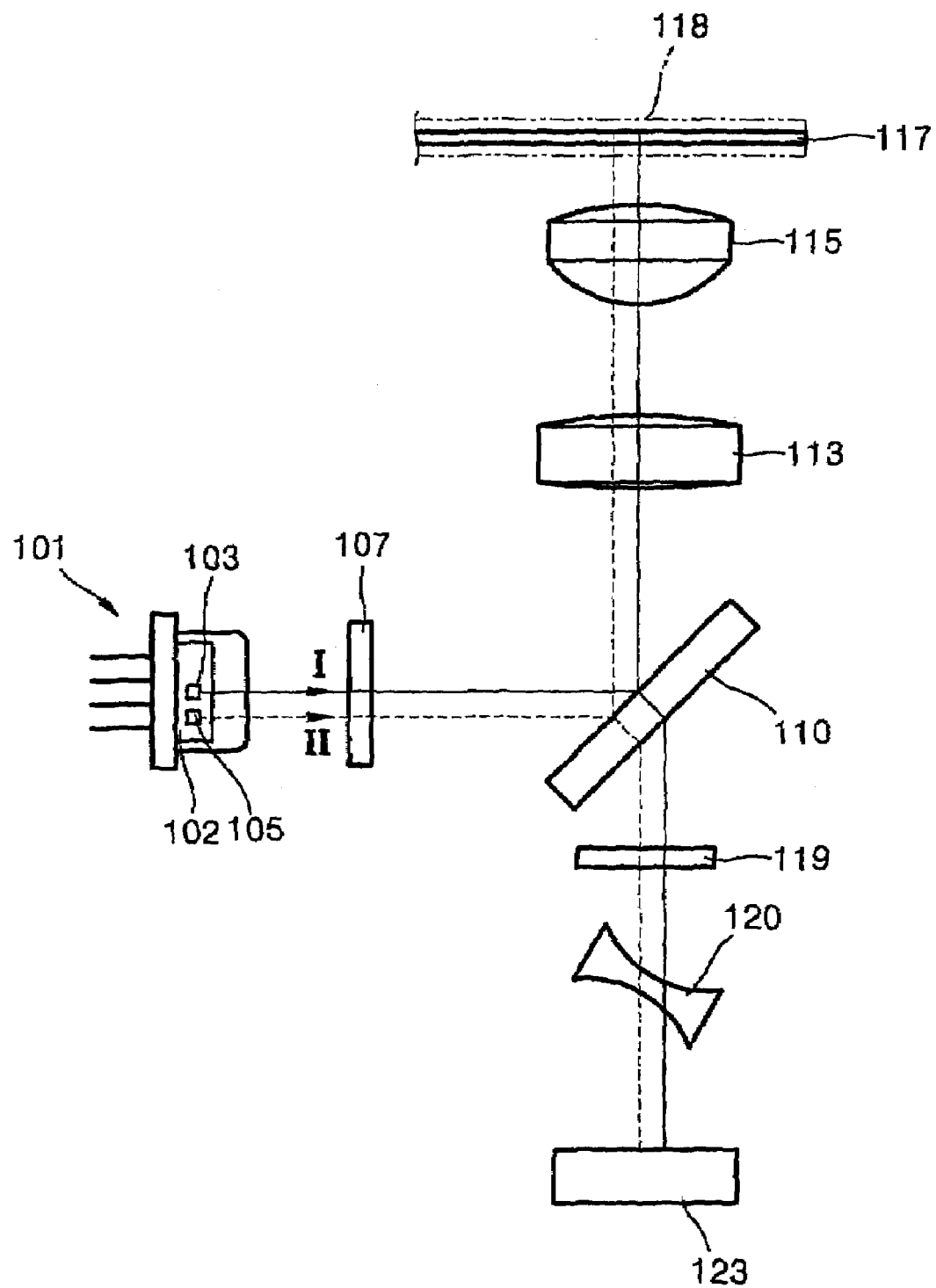
FIG. 6 is a view illustrating an optical pickup device, according to an aspect of the present invention.

Referring to FIG. 6, an optical pickup device, according to an aspect of the present invention, includes an optical module 101 in which first and second laser light sources 103 and 105 emitting first and second light beams I and II having different wavelengths are integrally formed as a package, a beam splitter 110 reflecting or transmitting light emitted from the optical module 101 to change an optical path, an objective lens 115 focusing the light reflected by the beam splitter 110 onto a relatively thin disc 117 or a relatively thick disc 118, and a photodetector 123 receiving and detecting the light that proceeds back after being reflected by the discs 117 and 118.

Figure 3A:
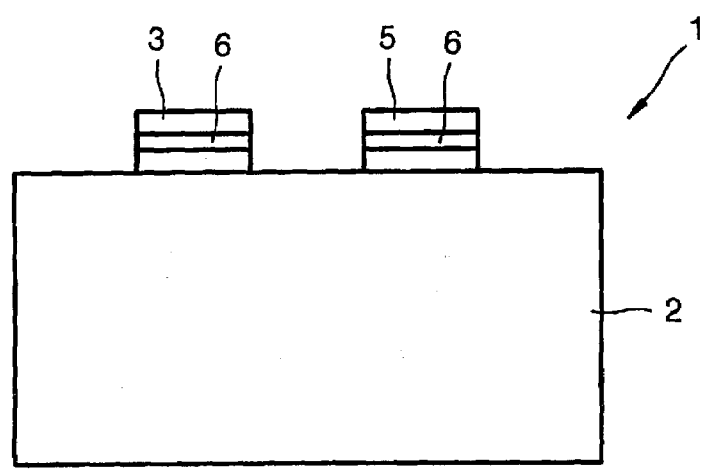
FIGS. 3A and 3B are views illustrating a conventional laser optical module and a profile of a light emitted from the conventional laser optical module, respectively.
Figure 3B:
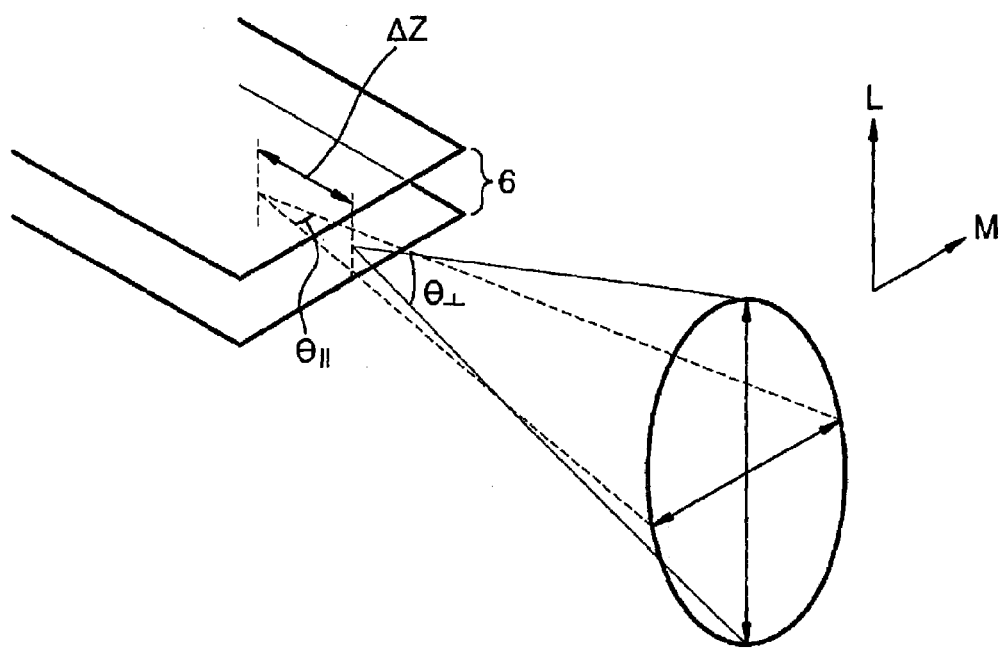
Figure 4:
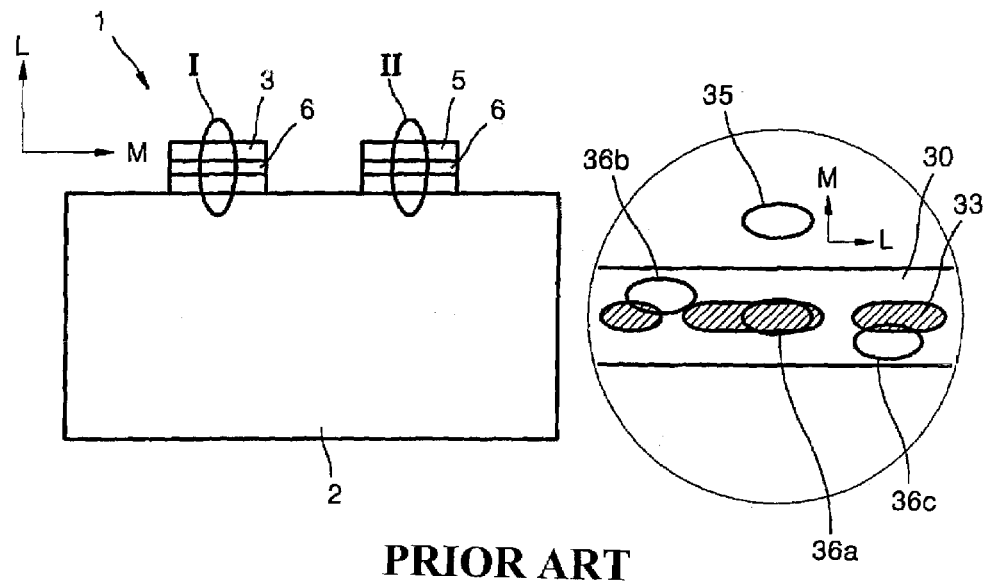
FIG. 4 is a view illustrating the conventional laser optical module and a state in which the light emitted from the conventional laser optical module is formed on the disc.
Figure 5A:
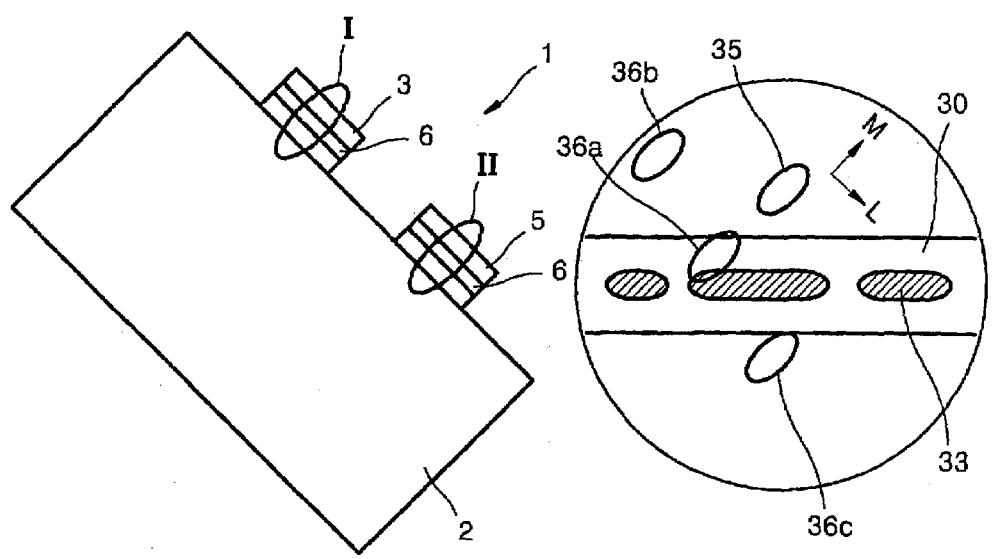
FIGS. 5A and 5B are views illustrating the state in which the light emitted from the conventional laser optical module is formed on the disc and a state of an arrangement of the photodetector, when the conventional laser optical module is rotated according to a conventional method of controlling an angle made between a major axis of the laser beam and a pit, respectively.
Figure 5B:
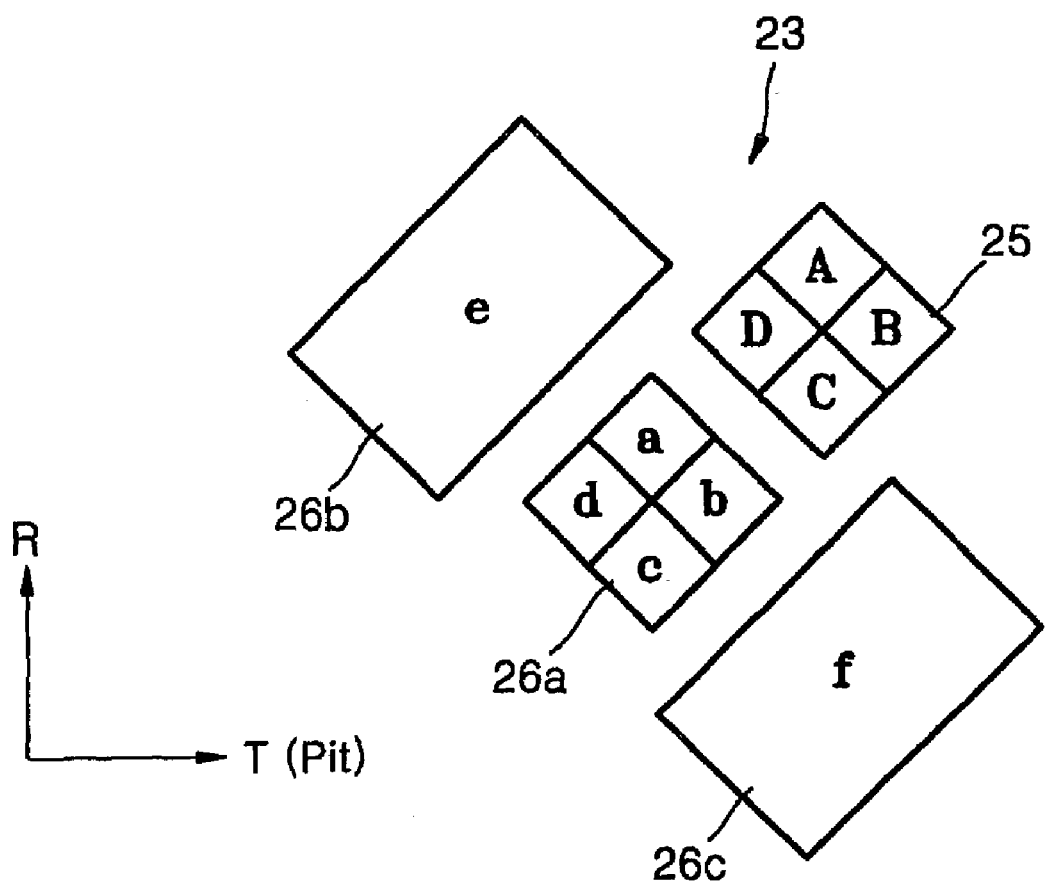

The first and second laser light sources 103 and 105 are mounted on a single mount 102 of the optical module 101. The first and second laser light sources 103 and 105 are installed by rotating one of the first and second laser light sources 103 and 105 by a predetermined angle with respect to another laser light source (refer to FIG. 5B). The optical module 101 is rotated around an optical axis. Here, the first laser light source 103 can be used for a DVD, for example, while the second laser light source 105 can be used for a CD, for example. According to an aspect of the present invention, the second laser light source 105 is rotated by 45° around the first laser light source 103 so that laser emission outlets of the first and second laser light sources 103 and 105 are arranged to be inclined by 45° with respect to a horizontal direction. As the laser emission outlets of the first and second laser light sources 103 and 105 are arranged to be inclined by 45°, laser beams are emitted in a state in which major axis of the laser beam (L; refer to FIG. 3B) is rotated by 45°. Accordingly, a laser beam spot is formed on the discs 117 and 118 in the state in which the major axis of the laser beam is inclined by 45°. Here, an angle between the major axis of the laser beam and a pit is an angle formed between a straight line in a direction along the major axis of the laser beam and another straight line in the direction of a pit row formed along the track.

A first grating 107 splitting the light emitted from the second laser light source 105 into three light beams is arranged between the optical module 101 and the beam splitter 110. A collimating lens 113 converting the incident light into a parallel beam is arranged between the beam splitter 110 and the objective lens 115.

Also, a second grating 119 correcting the position of a light spot formed on the photodetector 123 after being reflected by the discs 117 and 118 is provided between the beam splitter 110 and the photodetector 123. The second grating 119 has a pattern which may be rotated by a predetermined angle with respect to a pattern of the first grating 107. The predetermined angle is the same as the rotation angle of the optical module 101, for instance, about 45°.

Figure 7A:
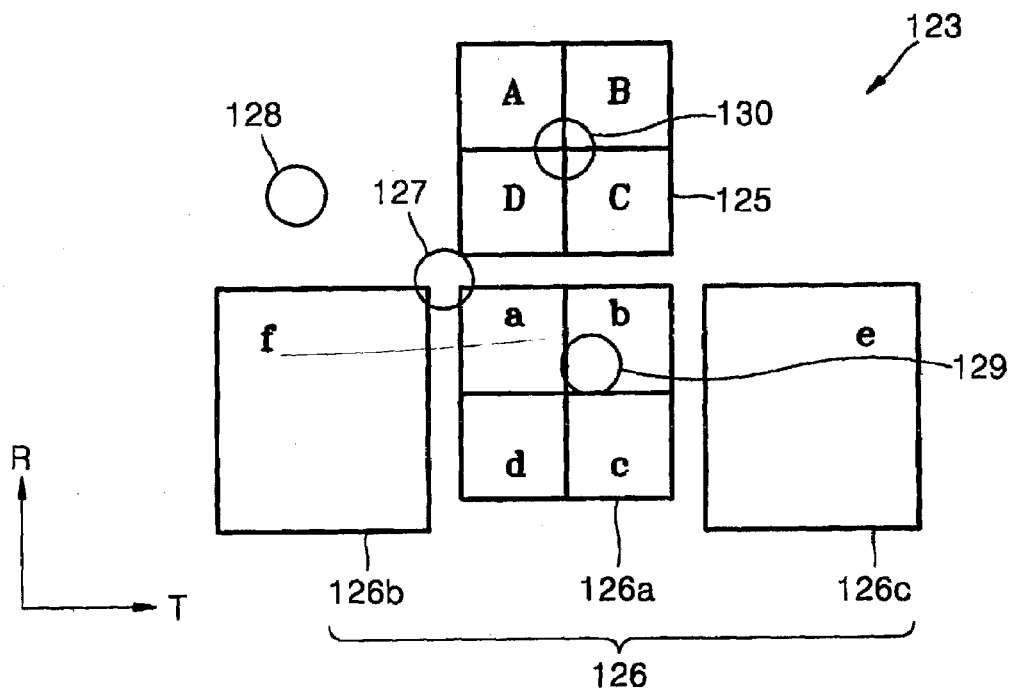
FIG. 7A is a view illustrating a state in which a light spot is formed on the photodetector when a second grating, according to an aspect of the present invention, is not provided.

The photodetector 123, as shown in FIG. 7A, can include, for example, a first optical sensor 125 receiving the light emitted from the first laser light source 103 and reflected by the relatively thin disc 117, for example, the DVD, and a second optical sensor 126 receiving the light emitted from the second laser light source 105 and reflected by the relatively thick disc 118, for example, the CD. The first optical sensor 125 is, for example, a four-section optical sensor. The second optical sensor 126 can be formed of a four-section main optical sensor 126a and first and second side optical sensors 126b and 126c which are disposed at both sides of the four-section main optical sensor 126a.

An concave lens 120 may further be provided between the beam splitter 110 and the photodetector 123.

Figure 7B:
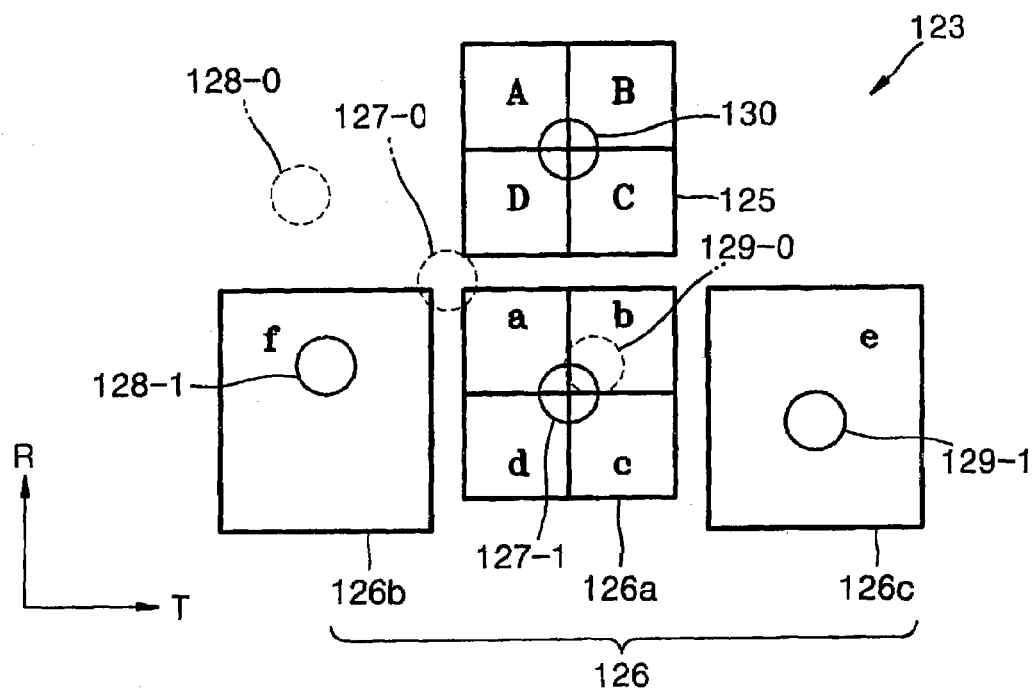
FIG. 7B is a view illustrating a state in which a position of the light spot is formed in the photodetector and is adjusted using the second grating in the optical pickup device, according to an aspect of the present invention.

In the operation of the optical pickup device having the above structure, according to an aspect of the present invention, because the optical module 101 is rotated by 45° with respect to the optical axis, the position of the light spot formed on the photodetector 123 is out of the photodetector 123, as shown in FIG. 7A. FIG. 7A shows a state before the position of the light spot is corrected by the second grating 119. The state after the position of the light spot formed on the photodetector 123 is corrected by using the second grating is shown in FIG. 7B. Here, in the following description, the second laser light source 105 is rotated by a predetermined angle around the first laser light source 103.

Because the second laser light source 105 is rotated around the first laser light source 103, when the light reflected by the discs 117 and 118 are focused on the photodetector 123, a main beam 130 from the first laser light source 103 is focused on the first optical sensor 125 while a main beam 127 of the three beams emitted from the second laser light source 105 and split by the first grating 107 is focused by being rotated by a predetermined angle around the main beam 130 and side beams 128 and 129 are focused at both sides of the main beam 127.

The positions of the light spots of the light emitted from the second laser light source 105 and split into three light beams by the first grating 107 and deviated from the second optical sensor 126, are corrected by the second grating 119 to be focused on the second optical sensor 126.

Referring to FIG. 7B, when passing through the second grating 119, the main beam 127 and the first and second side beams 128 and 129 are diffracted and split into a $0^{th}$ order beam and $\pm 1^{th}$ order beam, respectively. Here, because a grating pattern of the second grating 119 is rotated by a predetermined angle with respect to a grating pattern of the first grating 107, the $0^{th}$ order beam and $\pm 1^{th}$ order beam split from the main beam 127 and the first and second side beams 128 and 129 are formed by being rotated according to the arrangement of pattern of the second grating 119. Beams 127-0, 128-0, and 129-0 indicated by a dotted line denote the $0^{th}$ order beams to the main beam 127 and the first and second side beams 128 and 129. The $\pm 1^{st}$ order beams or $-1^{st}$ order beams to the main beam 127 and the first and second side beams 128 and 129 are focused on the four-section main optical sensor 126a and the first and second side optical sensors 126b and 126c, respectively.

According to an aspect of the present invention, the position of the light spot formed on the photodetector 123 can be adjusted by using the first grating 107. However, when the first grating 107 is moved, because the light focused on the disc 117 or 118 is deviated from the track, tracking servo is not possible. Thus, an additional grating to correct the position of the light spot focused on the photodetector needs to be provided.

In a method of adjusting the angle between the major axis of the laser beam and the pit, according to an aspect of the present invention, referring to FIG. 6, in the optical module 101 where the first and second laser light sources 103 and 105 emitting the light beams having different wavelengths are integrally formed, one of the first and second laser light sources 103 and 105 is arranged by being rotated by the predetermined angle with respect to the other light source. By doing so, the laser beams emitted from the first and second light sources 103 and 105 are focused on the discs 117 and 118 such that the major axis of each light beam is rotated by the predetermined angle. Thus, an angle θ (refer to FIG. 5A) between the major axis of the laser beam and the pit is adjusted as much as the optical module 101 is rotated.

The angle between the major axis of the laser beam and the pit can be about 45° by rotating the optical module 101 by about 45°. The above method improves capability to handle a birefringent disc, as described above, and contributes to improvement of disc recording/reproduction performance. Next, the light reflected by the discs 117 and 118 and passing through the objective lens 115 and the beam splitter 110 is diffracted by the second beam splitter 119. Here, by arranging the second grating 119 to be deviated by the predetermined angle with respect to the grating pattern of the first grating 107, the light passing through the second grating 119 is split and deviated by the predetermined angle. In other words, the light emitted from the second laser light source 105 is split into three beams by the first grating 107, and the three beams reflected by the discs 117 and 118 are split again into three beams of the $0^{th}$ order beam, the $+1^{st}$ order beam, and the $-1^{st}$ order beam, respectively, as the beams pass through the second grating 119. By adjusting the grating pattern of the second grating 119, the $+1^{st}$ order beams or the $-1^{st}$ order beams are focused on the four-section main optical sensor 126a, and the first and second side optical sensors 126b and 126c corresponding thereto.

Figure 8:
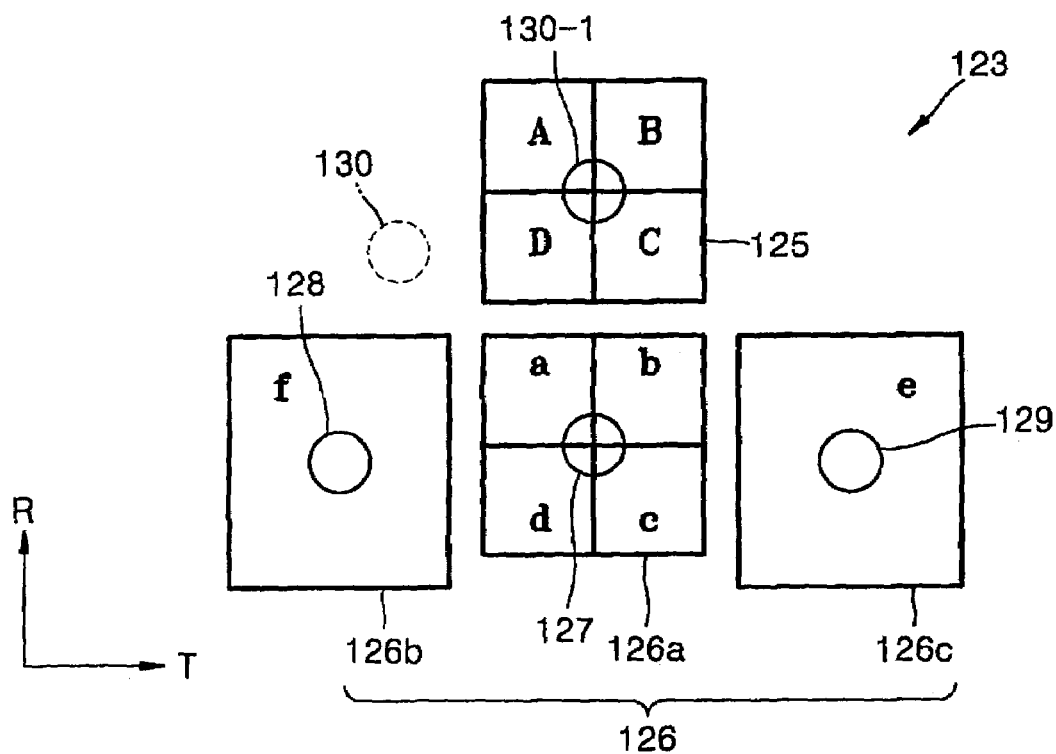
FIG. 8 is a view illustrating the state in which the position of the light spot formed on the photodetector is adjusted when a first laser light source is rotated with respect to a second laser light source in the optical pickup device, according to an aspect of the present invention.

In the above aspect according to the present invention, the second laser light source 105 is rotated by the predetermined angle with respect to the first laser light source 103. FIG. 8 shows the case in which the first laser light source 103 is rotated by the predetermined angle with respect to the second laser light source 105. Because the first laser light source 103 is rotated around the second laser light source 105, three beams emitted from the second laser light source 105 are formed on the four-section main optical sensor 126a and the first and second side optical sensors 126b and 126c, while the light beam 130 emitted from the first laser light source 103 is deviated from the first optical sensor 125.

Here, the light emitted from the first laser light source 103 is split by adjusting the pattern of the second grating 119 so that the $+1^{st}$ order beam or the $-1^{st}$ order beam are focused on the first optical sensor 125.

As described above, in an optical pickup device and a method of adjusting an angle between a major axis of a laser beam and a pit, according to an aspect of the present invention, because the angle between the major axis of the laser beam and the pit is adjusted to be about 45°, a reproduction signal characteristic is improved and capability to handle a birefringent disc is improved.

Although a few aspects of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup device for a relatively thick disc and/or a relatively thin disk, comprising:
    a mount;
    first and second light services emitting light beams having different wavelengths;
    an optical module in which the first and second laser light sources are horizontally mounted on the mount and one of the first and second light sources is rotated by a predetermined angle with respect to the other light source;
    a first grating splitting the light beams emitted from the second light source;
    a beam splitter changing optical paths of the light beams emitted from the first and second laser light sources;
    an objective lens focusing the light beams passing through the beam splitter onto the relatively thick disc or the relatively thin disc;
    a photodetector receiving an incident light beam, which is reflected by the relatively thick disc or the relatively thin disc and passes through the objective lens and the beam splitter; and
    a second grating arranged on an optical axis between the beam splitter and the photodetector and correcting a position of a light spot formed on the photodetector.

2. The optical pickup device as claimed in claim 1, wherein the predetermined angle is about 45°.

3. The optical pickup device as claimed in claim 2, further comprising:
    a collimating lens on the optical path between the objective lens and the beam splitter.

4. The optical pickup device as claimed in claim 2, further comprising:
    a concave lens focusing an incident light beam onto the photodetector and arranged on the optical path between the beam splitter and the photodetector.

5. The optical pickup device as claimed in claim 1, further comprising:
    a collimating lens on the optical path between the objective lens and the beam splitter.

6. A method of adjusting an angle between a major axis of a light spot of a laser beam emitted from an optical module comprising first and second light sources, a first grating, a second grating, a beam splitter, an objective lens, and a photodetector, wherein, in the optical module, the first and second laser light sources emitting light beams having different wavelengths are integrally formed, and incident on a disc, where a pit formed on the disc, the method comprising:
    arranging the first and second laser light sources by rotating one of the laser light sources by a predetermined angle with respect to the other laser light source;
    splitting the light beam emitted from the second laser light source into three beams by a first grating, wherein the light beam emitted from the first or second laser light source pass through the first grating, the beam splitter, and the objective lens and is reflected by the disc; and
    correcting a position of the light spot focused on the photodetector by using the second grating comprising a pattern deviated by the predetermined angle with respect to a pattern of the first grating, when the light beam split by the first grating into three beams is reflected by the disc and proceeds back.

7. The method as claimed in claim 6, wherein the predetermined angle is about 45°.

8. The method as claimed in claim 7, further comprising:
    providing a collimating lens on an optical axis between the objective lens and the beam splitter.

9. An optical pickup device for a relatively thick disc and/or a relatively thin disk, comprising:
    first and second laser light sources emitting first and second light beams having different wavelengths;
    a first grating splitting the light beams emitted from the second light source into three light beams;
    a beam splitter changing optical paths of the light beams emitted from the first and second laser light sources;
    an objective lens focusing the light beams passing through the beam splitter onto the relatively thick disc or the relatively thin disc;
    a photodetector receiving and detecting the light beams that proceed back after being reflected by the relatively thick disc or the relatively thin disc; and
    a second grating between the beam splitter and the photodetector correcting a position of a light spot formed on the photodetector after being reflected by the relatively thin disc or the relatively thick disc, wherein the second grating comprises a pattern that is rotated by a predetermined angle with respect to a pattern of the first grating.

10. The optical pickup device as claimed in claim 9, wherein an angle between a major axis of the light beams and a pit of the relatively thick disc or the relatively thin disc is an angle formed between a straight line in a direction along the major axis of the light beams and another straight line in a direction of a pit row formed along a track of the relatively thick disc or the relatively thin disc.

11. The optical pickup device as claimed in claim 9, wherein first and second laser light sources are installed by rotating one of the first and second laser light sources by a predetermined angle with respect to the other laser light source.

12. The optical pickup device as claimed in claim 9, wherein the relatively thin disc comprises a DVD.

13. The optical pickup device as claimed in claim 9, wherein the relatively thick disc comprises a CD.

14. The optical pickup device as claimed in claim 9, further comprising:
    an optical module rotated around an optical axis in which first and second laser light sources are integrally formed, wherein the first grating is between the optical module and the beam splitter; and
    a collimating lens between the beam splitter and the objective lens.

15. The optical pickup device as claimed in claim 9, further comprising:
    a first optical sensor receiving the light beams from the first laser light source and reflected by the relatively thin disc; and
    a second optical sensor receiving the light beams from the second laser light source and reflected by the relatively thick disc.

16. The optical pickup device as claimed in claim 15, wherein the first optical sensor comprises a four-section optical sensor and the second optical sensor comprises a four-section main optical sensor and first and second side optical sensors, which are disposed at both sides of the four-section main optical sensor.

17. The optical pickup device as claimed in claim 16, wherein because the first laser light source is rotated around the second laser light source, the three beams emitted from the second laser light source are formed on the four-section main optical sensor and the first and second side optical sensors, while the light beam emitted from the first laser light source is deviated from the first optical sensor.

18. The optical pickup device as claimed in claim 9, further comprising:
wherein the second laser light source is rotated by 45° around the first laser light source, so that a laser beam spot is formed on the relatively thin disc or the relatively thick disc where a major axis of the laser beam and the pit is inclined by 45°.

19. The optical pickup device as claimed in claim 9, wherein the predetermined angle is about 45°.

20. The optical pickup device as claimed in claim 9, wherein, when passing through the second grating, the main beam and the first and second side beams are diffracted and split into a 0th order beam and ±1th order beam, respectively.

21. The optical pickup device as claimed in claim 9, further comprising:
a concave lens between the beam splitter and the photodetector.

22. The optical pickup device as claimed in claim 9, wherein the position of the light spot formed on the photodetector is adjusted by using the first grating.

23. A method of an optical pickup device for a relatively thick disc and/or a relatively thin disk, wherein the optical pickup comprises a photodetector, a first grating, and a second grating, the method comprising:
emitting first and second light beams having different wavelengths;
splitting the light beams into three light beams using a first grating;
changing optical paths of the light beams emitted;
focusing the split light beams onto the relatively thick disc or the relatively thin disc;
receiving and detecting the light beams that proceed back after being reflected by the relatively thick disc or the relatively thin disc; and
correcting a position of a light spot formed on the photodetector using the second grating after being reflected by the relatively thin disc or the relatively thick disc, wherein the second grating comprises a pattern that is rotated by a predetermined angle with respect to a pattern of the first grating.

* * * * *